(No Model.) 5 Sheets—Sheet 1.
E. OEHRLE.
TAMPING MACHINE FOR MAKING CEMENT PIPES.
No. 497,597. Patented May 16, 1893.
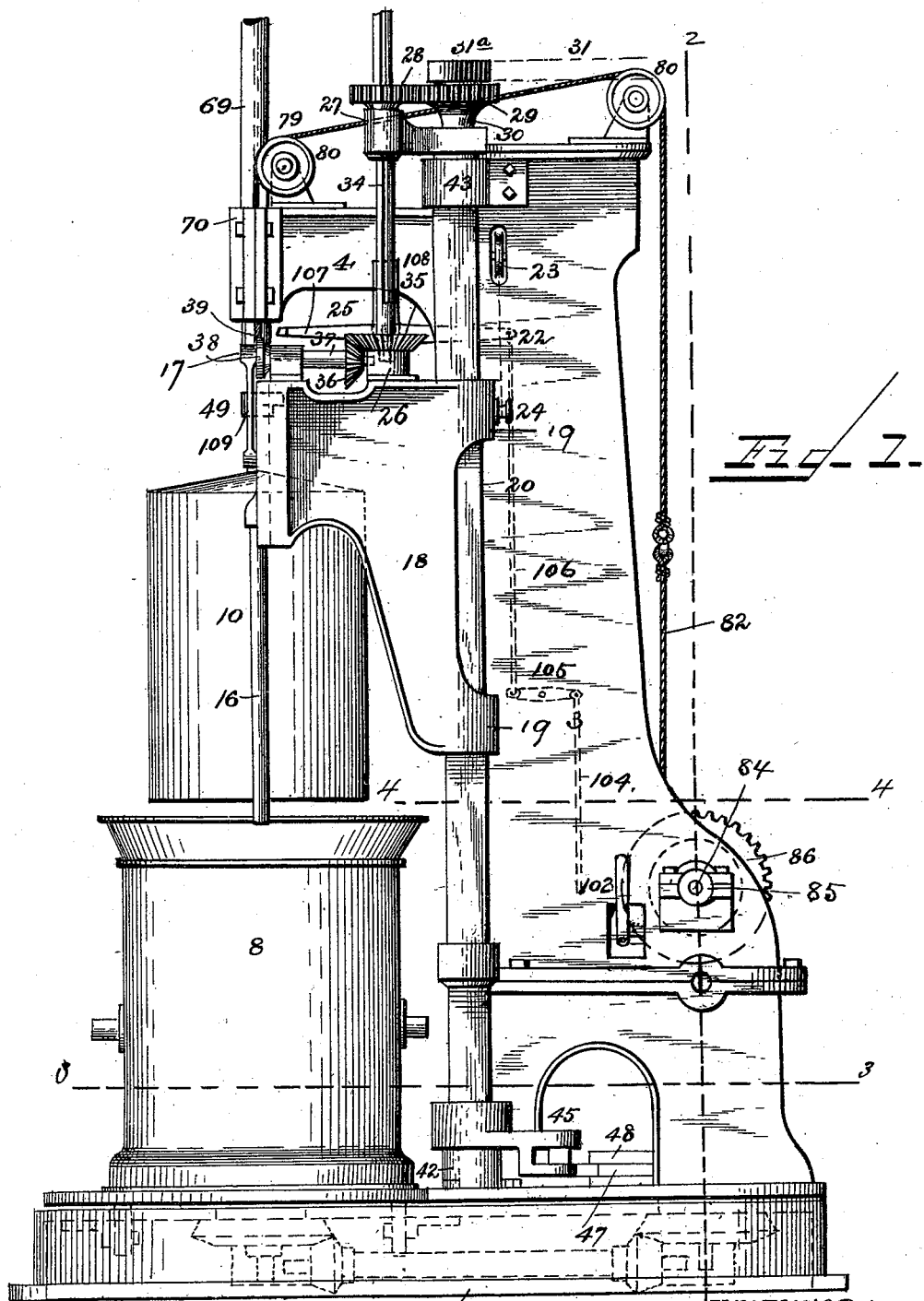
WITNESSES: INVENTOR:
Emanuel Oehrle, (No Model.) 5 Sheets—Sheet 2.
E. OEHRLE.
TAMPING MACHINE FOR MAKING CEMENT PIPES.
No. 497,597. Patented May 16, 1893.
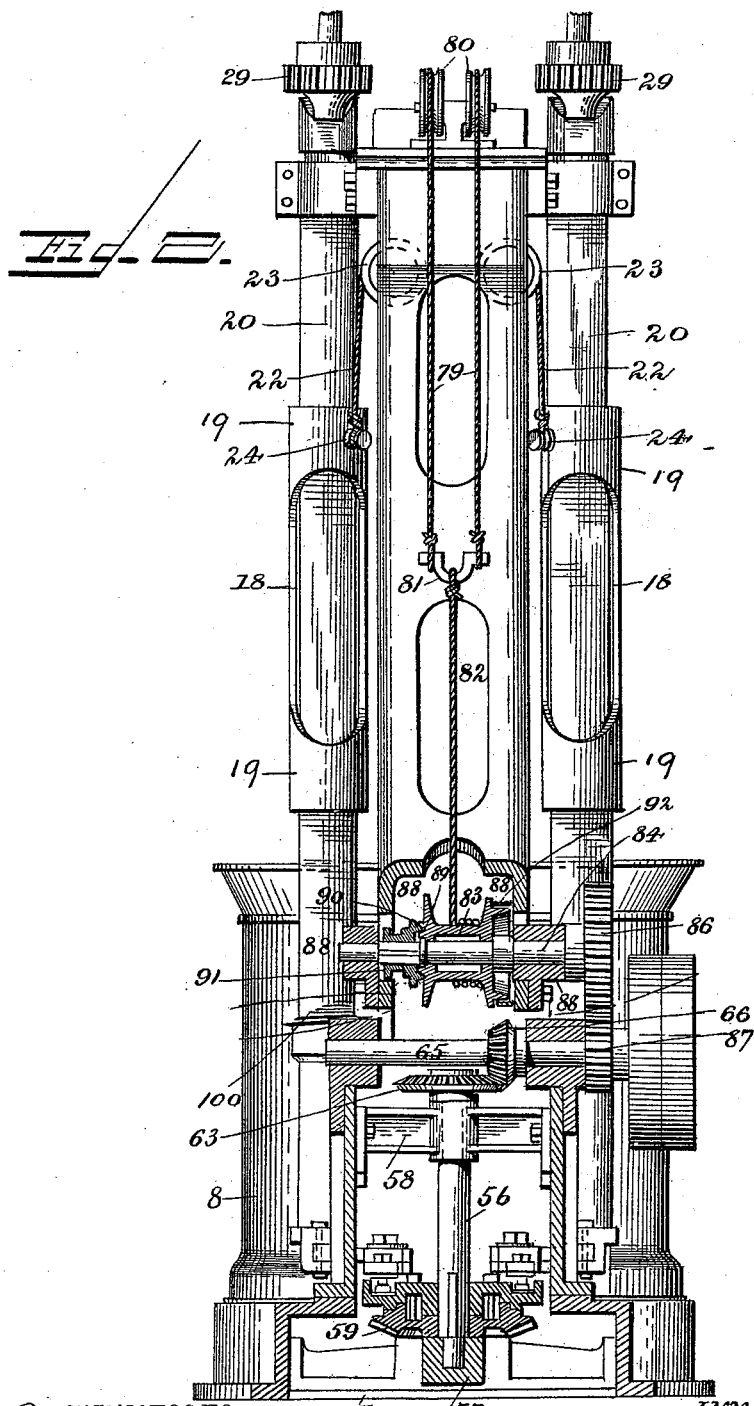
WITNESSES: INVENTOR.
Emanuel Oehrle,
Attorneys.

(No Model.) 5 Sheets—Sheet 3.
E. OEHRLE.
TAMPING MACHINE FOR MAKING CEMENT PIPES.
No. 497,597. Patented May 16, 1893.
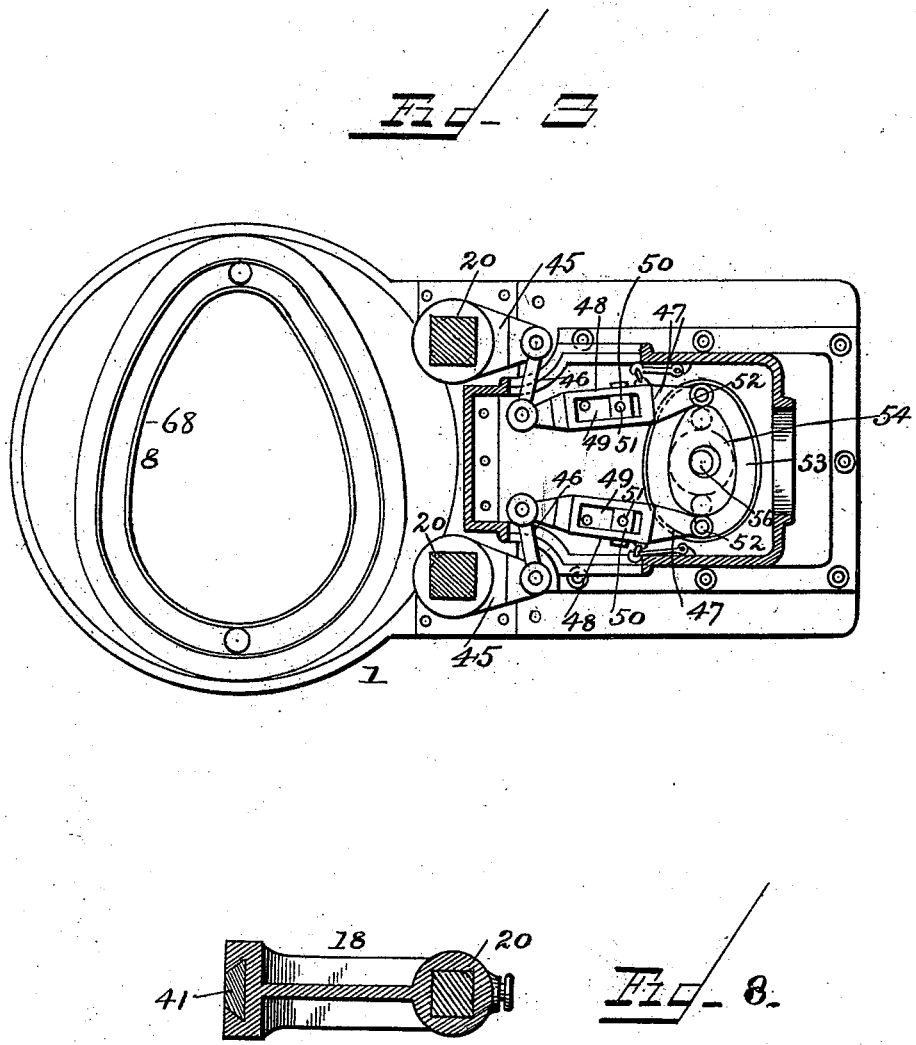

(No Model.) 5 Sheets—Sheet 4.
E. OEHRLE.
TAMPING MACHINE FOR MAKING CEMENT PIPES.
No. 497,597. Patented May 16, 1893.
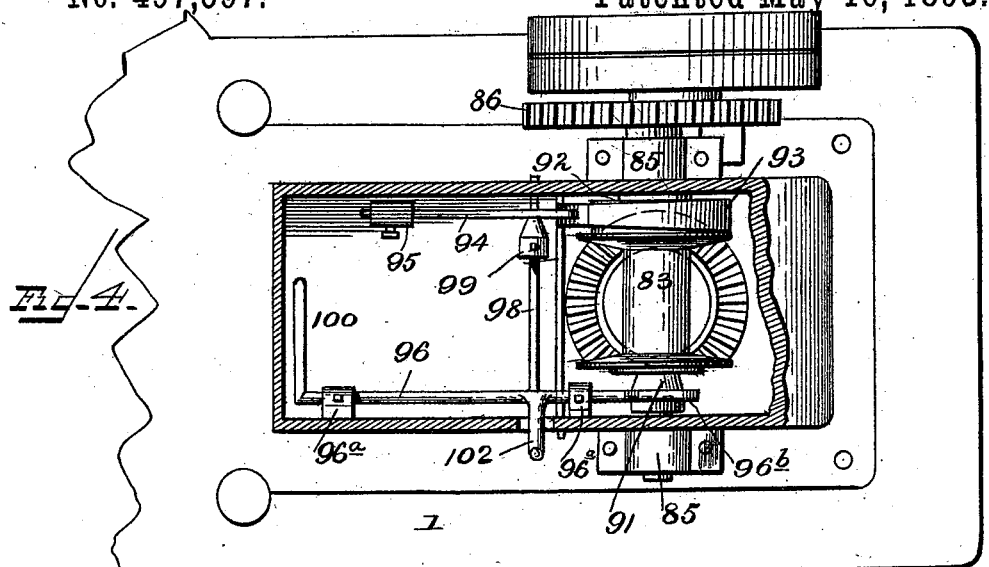
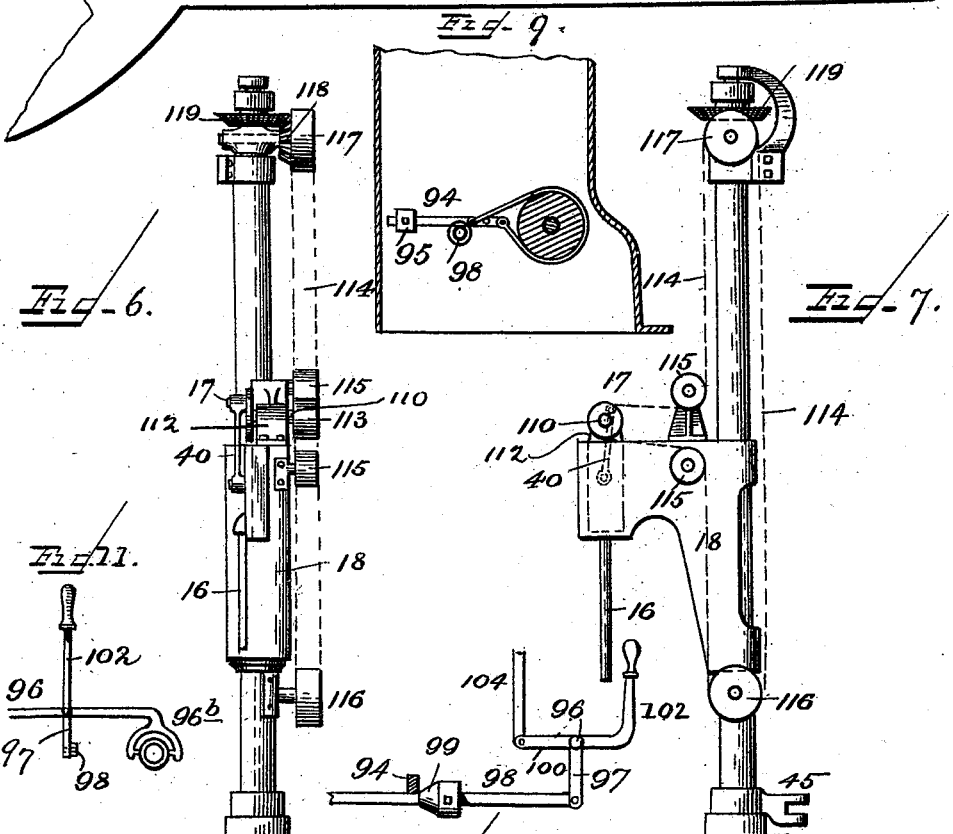
WITNESSES:
F. L. Ourand
INVENTOR:
Emanuel Oehrle,
Attorneys

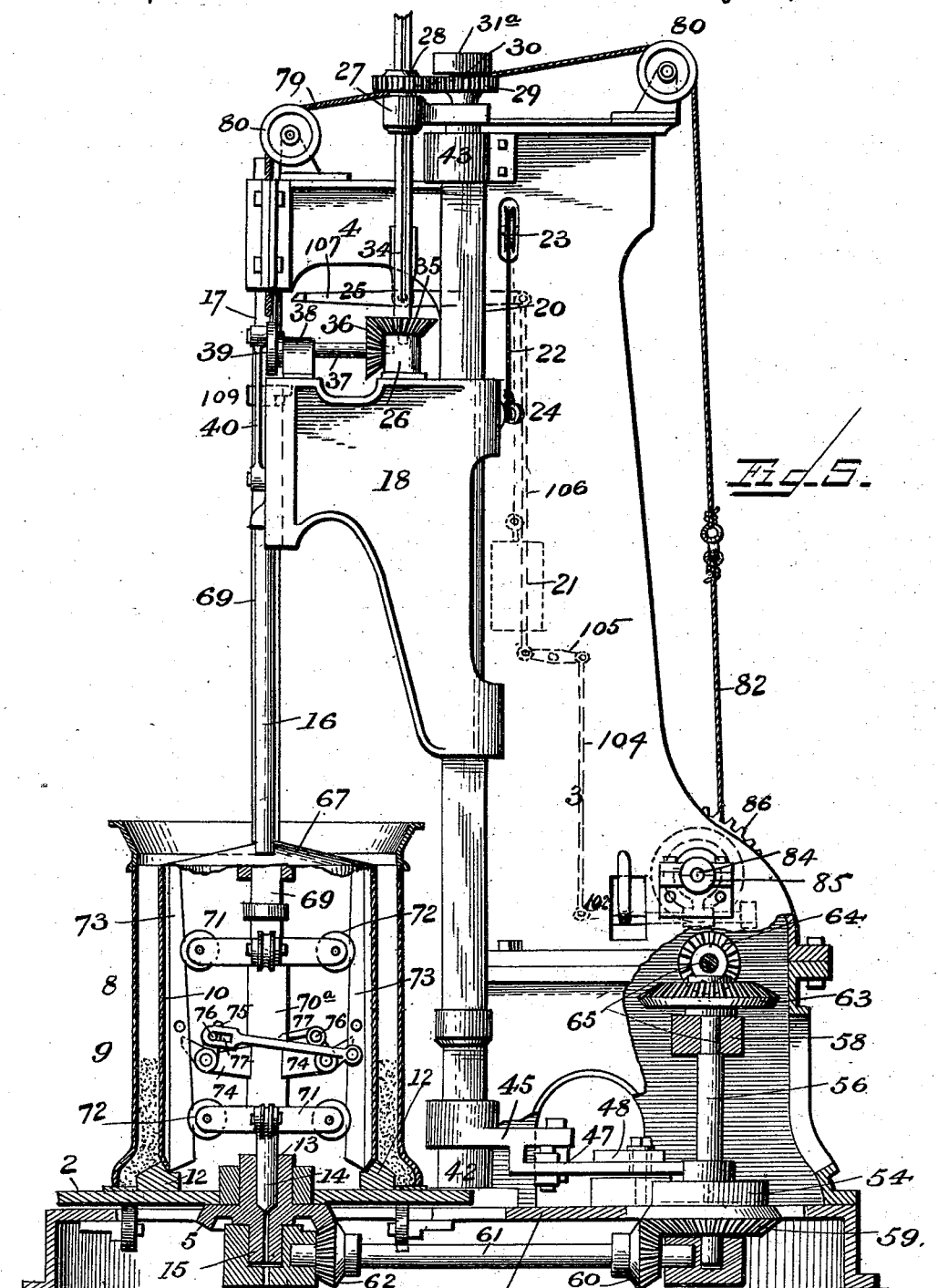

UNITED STATES PATENT OFFICE.

EMANUEL OEHRLE, OF OMAHA, NEBRASKA, ASSIGNOR TO JEFF W. BEDFORD, OF SAME PLACE.

TAMPING-MACHINE FOR MAKING CEMENT PIPES.

SPECIFICATION forming part of Letters Patent No. 497,597, dated May 16, 1893.

Application filed September 15, 1892. Serial No. 446,009. (No model.)

*To all whom it may concern:*

Be it known that I, EMANUEL OEHRLE, a citizen of the United States, and a resident of Omaha, in the county of Douglas and State of Nebraska, have invented certain new and useful Improvements in Machines for Making Cement Sewer-Pipes; and I do hereby declare that the following is a full, clear, and exact description of the invention, which will enable others skilled in the art to which it appertains to make and use the same, reference being had to the accompanying drawings, which form a part of this specification.

My invention relates to improvements in machines for making cement sewer pipes and is designed as an improvement upon the invention disclosed in Letters-Patent granted to me July 26, 1892, No. 479,451.

The object of the present invention is to provide an improved construction of sewer pipe machine whereby I obtain superior results with respect to simplicity and economy in manufacture and efficiency in use.

The invention consists in the novel construction and combination of parts, hereinafter fully described and claimed.

In the accompanying drawings: Figure 1 is a side elevation of a machine for making sewer pipe, constructed in accordance with my invention. Fig. 2 is a transverse section of the same, on the line 2—2, Fig. 1. Fig. 3 is a horizontal section on the line 3—3, Fig. 1. Fig. 4 is a similar view on the line 4—4, Fig. 1. Fig. 5 is a side elevation partly in section. Figs. 6 and 7 are views of a modified construction for operating the rammers. Fig. 8 is a detail sectional view of the arm which carries the rammer. Figs. 9, 10 and 11 are detail views of the winding drum and means for throwing it in and out of operative condition.

In the patent before referred to, the principal mechanisms of the machine consist, first, of a vertical pipe mold having an exterior section to form the periphery of the pipe, and an interior section to form the core, and a third section to form the interior of the bell of the pipe; second a mechanism for contracting said interior section of the mold and for withdrawing or raising the same from the outer section after molding; third a mechanism for rotating the mold while molding, and fourth a mechanism for ramming the cement mixture into the mold by steam rammers, in conjunction with mechanisms for partially counterbalancing the pressure of the steam rammers to obtain a desired equal density of the rammed cement in the mold.

The invention is designed more especially for manufacturing oval or egg-shaped pipe, and the improvements upon the patent above alluded to relate first, to the means for reciprocating the rammers to compress the material in the mold; second, to the means for oscillating the supports carrying the rammers in unison with the mold; third in the means for elevating the mold core, after the pipe is molded; and fourth means for throwing the winding drums, connected by a rope or cable connected with the core, into and out of operative condition.

In the said drawings the reference numeral 1 designates the bed-plate of the machine, which is hollow underneath. The top of its forward part has a central slot, and its hollow space underneath contains the mechanism for supporting the mold and table 2, and for rotating the same. Upon the rear portion of said plate or bed is erected a hollow column 3, on the top of which is secured a strong forward projecting arm 4 to carry the core raising machinery.

To the under side of table 2 is secured a central bevel-wheel 5, which is supported by a horizontal lateral cross-head 6, secured to the bed plate, as shown in Figs. 1 and 5.

Upon the top of the table is carried the sewer pipe mold 8, consisting of three sections, the sheet-metal outside shell 9, an inner shell or core mold 10, and a ring 12, or inner bell mold. The shell 9 is made with a projection for forming the bell, and all the shape of the outer surface of the pipe, the shell 10 to form the inner shape of the pipe, and the ring 12, the inner shape of the bell of the pipe, and between the inner shell 10, and outer shell 9, and the ring 12, is a space in which the cement mixture is rammed to form the entire pipe. The bevel-wheel 5 has an upwardly extending hub 13, having a central bore 14, and is provided with a downwardly projecting journal 15, which has its bearings in the cross-head 6.

For the purpose of ramming suitably and rapidly the cement mixture into said space of the mold, I employ one, two or more rammers 16, which are each rapidly reciprocated by means of cranks 17, operated as hereinafter described, and each arranged on an arm 18 above the mold. Each of these arms 18 is provided with angular sleeves 19, which embrace a correspondingly shaped angular shaft 20, so as to be capable of sliding vertically upon said shaft, but not of rotating thereon. Each of said arms is partly counterbalanced by a weight 21, connected with a rope 22, passing over a sheave 23, journaled in the column 3, the other end of said rope being connected with sleeve 19, at 24.

The numeral 25 designates a rotatable shaft, the lower end of which is journaled in a bearing 26 secured to said arm. The upper end of this shaft passes through a bracket 27, secured to the column 3, and is provided with a small gear-wheel or pinion 28, meshing with a similar pinion 29, secured to a short shaft 30, journaled in the bracket 27. This shaft is driven by a belt 31 connected with any suitable motive power passing over a pulley 31ª on shaft 30.

The pinion 28 is provided with a key or feather 32, which engages with a vertical groove 34, in the shaft 25, so as to allow said shaft to move vertically with the arm, yet at the same time to cause it to be rotated when the pinion is rotated. The lower end of shaft 25 is provided with a bevel pinion 35 meshing with a similar pinion 36, on a shaft 37 journaled in the bearing 26, and a bearing 38. At its opposite end the shaft 37 is provided with a crank-disk 39 with which is connected a pitman 40 connected with the rammer. The rammer is provided with a dove-tailed head 41 which works in a correspondingly shaped vertical groove in the arm 18.

Near the lower end of each shaft 20, which shafts are journaled in a bearing 42, secured to the bed-plate and a bearing 43, near the bottom of the column 3, is secured a bifurcated arm 45, with which is connected a link 46, pivoted to one end of a lever 47, having an upward extension 48 near its center, provided with a slot 49, in which is located an adjustable block 50, pivoted to the bed-plate 1, by means of a pivot pin 51. The opposite ends of these levers are provided with rollers 52, which work in a groove 53, in a pattern or cam-plate 54, corresponding in shape and moving in unison with the pipe-mold. This pattern is provided with a central vertical shaft 56 journaled in a block 57 secured to the bed-plate and also in a cross-piece 58 secured to the column 3. The lower end of this shaft is provided with a bevel-wheel 59 which meshes with a bevel-pinion 60, mounted on a horizontal shaft 61 journaled in block 57 and cross-head 6, and is provided with a bevel pinion 62 meshing with bevel-wheel 5, by which the table 2 and pipe mold are rotated. At the upper end of shaft 56 is a bevel-wheel 63, with which meshes a bevel pinion 64 mounted upon a shaft 65 carrying a driving-pulley 66 connected with any suitable source of power by which the machine is operated.

The inner shell or core-mold 10 is constructed with a metal cover 67 to prevent the sand and cement from dropping inside said mold. The peripheral stud of the mold is made of sheet steel, with one longitudinal overlapping joint 68, see Fig. 3. Said shell is of the same general shape or contour as the shell 9, and of a diameter, when suspended and contracted by its arbor, hereinafter described, somewhat smaller than the required diameter of the core of the pipe.

The numeral 69 denotes the arbor consisting of a vertical rod or bar working in a sleeve 70 of the forwardly projecting arm 4 and a hub 70ª. This hub near its lower end is provided with two series of radially projecting arms 71, of four each, provided at their ends with grooved rollers 72, which engage with the edges of tapering vertical flanges 73 secured to the inner side of the shell 10. Secured to the arbor intermediate of the arms 71 are two diametrically opposite radial arms 74 provided with pivoted links 75, having studs 76 which work in slots in connecting rods 77, which extend across to the opposite side of the core, and are pivoted to the flange 73 aligned therewith.

For the purpose of elevating the mold core after the pipe has been formed and withdrawing it from the mold, I provide the following means: Passing through an aperture in the arbor 69 is a rope 79, the ends of which extend upwardly and over sheaves 80, and then downwardly. The said ends are then secured to a curved bar 81, to which is connected a rope 82 secured to a winding drum 83, loosely mounted on a shaft 84 journaled in boxes 85 secured to column 3. This shaft is provided with a cog-wheel 86 meshing with a cog 87 on the shaft 65. The drum is provided with heads 88, and in one of these heads is formed an annular groove 89, with which engages a corresponding flange 90, on a horizontally movable friction-clutch 91. The other head of the drum is formed with an annular flange 92, with which is adapted to engage a friction brake-strap 93, the ends of which are pivotally connected with a lever 94, pivoted to the column 3 intermediate of the connections of the said strap. This lever is provided at its opposite end with an adjustable weight 95.

The numeral 96 denotes a rotatable shaft journaled in lugs 96ª secured to the column 3, and at one end carries a curved arm 96ᵇ which engages with the clutch 91. This shaft intermediate of its ends is provided with a downwardly depending arm 97, with which is connected a transverse arm 98, provided with a conical block 99, which is adapted to engage with the lever 94 to raise and lower the same so as to loosen or tighten the friction-strap. At the opposite end the shaft 96 is provided with an inwardly extending arm 100 pivoted to a vertical rod 104, pivoted to a lever 105, which in turn is connected with a vertical rod 106, connected with one end of a lever 107, pivoted at or near its center to a downwardly extending bracket secured to arm 4. Secured to the shaft 96, is an operating handle 102. Secured to the arbor 69 is a lug 108, which when the arbor is elevated to withdraw the mold-core, will strike the free end of lever 107, and stop the movement of the drum, as will hereinafter appear.

The inner bell-core mold is secured to the table 2, and a hopper may be provided for the mold similar to that in my patent before referred to.

The operation is as follows: The outer mold 9, the bell mold 12, and the inner mold 10, being properly placed upon the table 2, cement mixture is fed in the hopper and from it delivered into the space between the inner mold and outer mold. The driving shaft is now set in motion by means of the driving pulley and connections, which in turn imparts motion to the shafts 56 and 61, rotates the table 2 and the pipe mold and also the pattern or cam-plate 54. As the mold is rotated a reciprocating motion is imparted to the rammers by means of the cranks and connections, thereby causing the cement to be rapidly, thoroughly and uniformly compacted. It will of course, be obvious that the arms carrying the rammers must be moved toward or away from the center of the mold as the latter rotates, owing to the oval shape thereof, and this is accomplished by the pattern 54, the cam-grooves 53, friction rollers 52, levers 47, arms 45, and shafts 20, which cause the said arms carrying the rammers to be moved in and out, said pattern being an exact duplicate in configuration of the mold and moving in unison therewith. As the cement continues to be fed to the mold, the rammers, together with the arms with which they are connected, will gradually rise, until they reach the top of the mold. The winding drum is then set in motion by means of the friction-clutch which is forced into contact with the groove in the head thereof by means of the lever 100, which also loosens the friction strap 93, so as to allow said drum to rotate. This will cause the arbor 69 to be elevated and by means of the arms 74, rods 77, links 75, and studs 76 will contract the mold core, so that it can readily be withdrawn from the mold, a collar 108 on said arbor striking an annular disk 109, through which said arbor passes, fixed to the inner shell or core. When the arbor and core have been elevated a distance sufficient to clear the mold, the lug 108 on the arbor will strike the free end of lever 107, actuating the same and its connections and actuating the lever 102, which in turn will rotate shaft 98 in a reverse direction and throw the friction-clutch out of mesh with the drums and tighten the friction strap whereby the rotation of the drum is stopped, the spring-dog 101 of lever 100 engaging with the notch in lever 102, and locking said levers together. The mold with the completed pipe therein is then removed from the table and a new mold placed thereon. By now slightly moving or easing up on the lever 107, the friction strap can be loosened without throwing the clutch into contact with the drum, so that the latter will rotate by the weight of the core which will be lowered into the mold, the speed of the descent being regulated by said levers.

In Figs. 7 and 8, I have shown a modification in the means for reciprocating the rammers. In this case, the shafts 25 and 37 are dispensed with, and a short transverse shaft 110 journaled in the bearing 112, secured to arm 18 provided at one end with a crank disk to which the pitman connected with the rammer is pivoted, and at the other end with a pulley 113, over which passes an endless belt 114, which in turn passes over pulleys 115 on the arm 18 and pulleys 116 and 117 at the upper and lower ends, respectively of the shaft 20. This belt is driven by a bevel pinion 118 secured to the shaft of pulley 117, and a bevel pinion 119 on the shaft 30 of the pulley 31$^a$.

Having thus described my invention, what I claim is—

1. In a machine for molding cement sewer pipe the combination with the rotatable table adapted to receive a pipe mold, of the vertically movable arm or rammer-stock, the shaft upon which it slides, the rotatable shaft journaled to said arm, having a crank-disk, the pitman connected thereto, the rammer pivoted to said pitman, and means for rotating said crank-shaft, to reciprocate the pitman, substantially as described.

2. In a machine for molding sewer pipe the combination with a rotatable table adapted to receive an oval or egg-shaped mold, of the oscillating vertical shaft, the vertically movable arm carried thereby, the horizontal shaft journaled thereto having a crank at one end, the pitman and rammer connected therewith, and means for rotating said horizontal shaft, and means for oscillating the vertical shaft, substantially as described.

3. In a machine for molding cement sewer pipe, the combination with the rotatable table adapted to receive an oval or egg-shaped mold, the oscillating vertical shaft, the vertically movable arm carried by said shaft and the reciprocating rammer, of the pattern plate separate from and independent of the said table and mold and conforming in contour with the mold, the adjustable connections between said pattern plate and the oscillating shaft and means for rotating said pattern plate in unison with the mold, substantially as described.

4. In a machine for molding cement sewer pipe, the combination with the rotatable table adapted to carry an oval or egg-shaped mold, the oscillating vertical shaft, the vertically movable arm carried by said shaft, and the reciprocating rammer, of the arm secured to said shaft, the link pivoted to said arm, the pivoted lever connected with said link, the pattern plate moving in unison with said mold and having a groove therein corresponding in contour with said mold, and the rollers pivoted to said lever and working in the groove in the pattern plate, substantially as described.

5. In a machine for molding cement sewer pipe, the combination with the rotatable table adapted to carry a pipe mold, of the vertically sliding arm, the vertical shaft upon which it slides, the horizontal shaft journaled in said arm and provided with a crank-disk, the pitman and rammer connected therewith, the pinion on the opposite end of said horizontal shaft, the vertical shaft having a pinion meshing with said pinion and provided with a vertical groove, the pinion on the upper end of said vertical shaft, having a feather or key working in said groove, and means for rotating said pinion, substantially as described.

6. In a machine for molding cement sewer pipe, the combination with the rotatable table adapted to carry an oval or egg-shaped pipe mold, of the vertically sliding arm, the oscillating vertical shaft upon which it slides, the horizontal shaft journaled in said arm and provided with a crank-disk, the pitman and rammer connected therewith, the pinion on the opposite end of said horizontal shaft, the vertical shaft having a pinion meshing with said pinion and provided with a vertical groove, the pinion on the upper end of said vertical shaft having a feather or key working in said groove, and means for oscillating said vertical shaft, and the arm carried thereby, substantially as described.

7. In a machine for molding cement sewer pipe, the combination with the rotatable table adapted to carry an oval or egg-shaped mold, of the vertically sliding arm, the oscillating vertical shaft upon which it slides, the horizontal shaft journaled in said arm, and provided with a crank-disk, the pitman and rammer connected therewith, the pinion on the opposite end of said horizontal shaft, the vertical shaft having a pinion meshing with said pinion and provided with a vertical groove, the pinion on the upper end of said vertical shaft having a feather or key working in said groove, the arm secured to the lower end of said oscillating shaft, the link pivoted thereto, the pivoted lever connected therewith and provided with a roller at its outer end, and the pattern plate moving in unison with the mold having a cam groove conforming to the contour of the mold, with which said roller engages, substantially as described.

8. In a machine for molding cement sewer pipe, the combination with the rotatable table adapted to carry a pipe-mold, the vertically movable arbor adapted to be connected with the core of said mold, the rope connected with said arbor, the drum to which said rope is secured provided with heads at each end, one of said heads being provided with an annular groove, the shaft upon which said drum is loosely mounted, the sliding friction-clutch, the annular rim upon the other head of the drum, the friction brake-strap, the pivoted lever to which said strap is connected provided with an adjustable weight, the transverse shaft having a conical block, the rotatable shaft with which said transverse shaft and the friction clutch are connected, the inwardly extending arm connected with said rotatable shaft, the vertical arm and connections and the operating handle secured to said rotatable shaft, substantially as described.

9. In a machine for molding cement sewer pipe, the combination with a pipe-mold, of the inner shell or core having an overlapping joint and a series of tapering vertical flanges, the arbor having a hub provided with a series of radially projecting arms carrying grooved rollers at their ends, the diametrically opposite arms secured to said arbor, having pivoted links provided with studs and the slotted rods pivoted to said flanges, and connected with said links, substantially as described.

10. In a machine for molding cement sewer-pipe the combination with the rotatable table adapted to receive a pipe-mold, of the vertical oscillating shaft, the vertically movable arm carried thereby, the shaft journaled in said arm, provided with pulleys, the pulleys on said oscillating shaft and the belt passing over said pulleys, substantially as described.

In testimony that I claim the foregoing as my own I have hereunto affixed my signature in presence of two witnesses.

EMANUEL OEHRLE.

Witnesses:
L. E. CLARK,
CHAS. B. JACOBS.